(No Model.)
W. W. TAYLOR.
VEHICLE WHEEL.
No. 482,658. Patented Sept. 13, 1892.
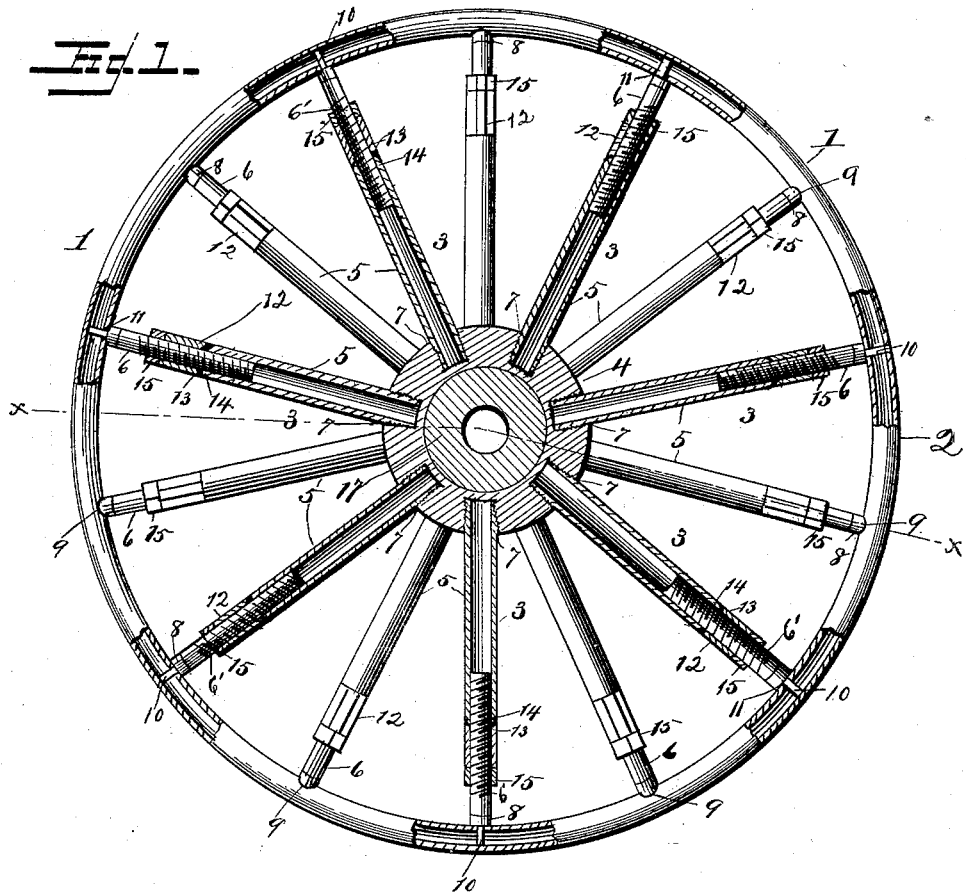
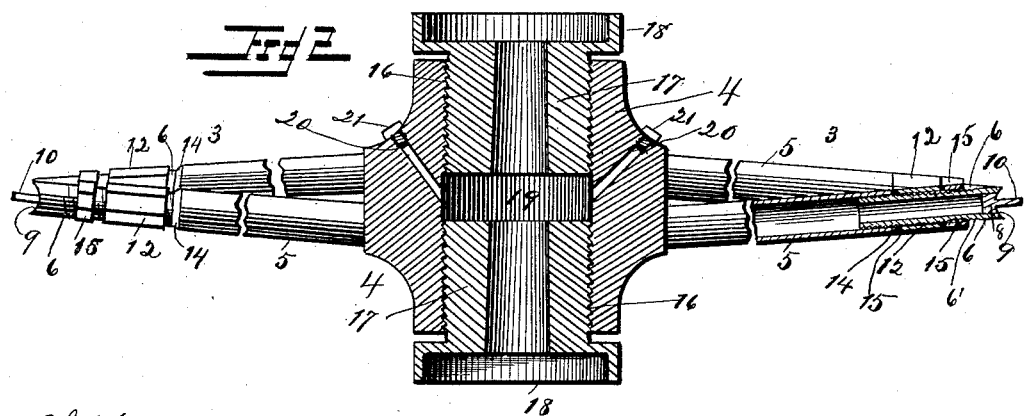
Witnesses:
J. M. Fowler Jr.
Andy Rawlings
Inventor
William W. Taylor,
By Robert Mason,
Attorney.

UNITED STATES PATENT OFFICE.

WILLIAM W. TAYLOR, OF WACO, KENTUCKY, ASSIGNOR OF ONE-HALF TO CHARLES L. SEARCY, OF SAME PLACE.

VEHICLE-WHEEL.

SPECIFICATION forming part of Letters Patent No. 482,658, dated September 13, 1892.

Application filed April 22, 1892. Serial No. 430,240. (No model.)

*To all whom it may concern:*

Be it known that I, WILLIAM W. TAYLOR, a citizen of the United States, residing at Waco, in the county of Madison and State of Kentucky, have invented certain new and useful Improvements in Vehicle-Wheels; and I do hereby declare the following to be a full, clear, and exact description of the invention, such as will enable others skilled in the art to which it appertains to make and use the same.

My invention relates generally to wheels for vehicles, and particularly to improvements in that class thereof which is provided with hollow or tubular metallic rims and spokes; and it consists in the peculiarities of construction and arrangement or combination of parts and features hereinafter fully disclosed in the description, claims, and drawings.

The objects of my invention are, first, to provide an improved wheel for vehicles, which is made wholly of metal and provided with a continuous hollow or tubular rim, which has no tire or other flat surface upon its periphery from which the usual jarring or jolting of vehicles often results, and which has no wooden fellies or metallic sections which often get out of place or become disarranged and broken, resulting in the trouble and expense of replacement, repair, and renewal; second, to provide a metallic vehicle-wheel with tubular spokes, which are made in two parts or sections having different lengths, and also differently-sized diameters, so as to adapt them to be telescoped along their adjacent ends, which are removably secured and firmly held at their inner and outer ends, respectively, by the hub and rim, and which are provided with means for effecting their lengthwise adjustment and for firmly holding their two parts or sections together after such adjustment, whereby not only the rim is tightened, but the entire wheel, and also all noise or rattling is prevented; third, to provide a vehicle-wheel of the kind thus described with a metallic hub, which is provided with a journal-box made in two parts or sections and removably secured in the opposite ends thereof, so as to permit of the same being easily taken out for repair or the like and for the purpose of exchanging or substituting boxes having differently-sized openings and securing a fit thereof to axle-journals of varying sizes, and which is also provided with lubricating devices that are peculiarly adapted and useful for this class of vehicle-wheels, and, fourth, to provide other novel and important parts and features which are accessorial to the attainment of these ends or results, and which tend to overcome some of the objections in the construction and operation of existing inventions of this character. These objects are accomplished by the peculiarities of construction and arrangement of the parts and features illustrated in the accompanying drawings, forming part of this specification, in which the same reference-numerals indicate the same or corresponding parts and features, and in which—

Figure 1 represents a side elevation of my improved vehicle-wheel, some of the parts thereof being in section and others broken away; and Fig. 2, a horizontal section thereof, the section being taken on the dotted line *x x* of Fig. 1 and the rim omitted.

In the drawings, the numeral 1 indicates my improved vehicle-wheel, which is provided with the rim 2, the spokes 3, and the hub 4, which are constructed and arranged as follows: The rim 2 is continuous and hollow or tubular in construction and may be made of any kind of metal, but preferably of wrought-iron or steel; also, this rim is constructed of a single piece of tube or pipe, which is bent into circular form and united by either pressing and brazing its ends together or by inserting a round plug of iron therein and then welding the same together, the union or connection thus formed being firm and strong when effected in either of these ways; also, a rim is thus produced which is not provided with a tire or any other flat surface around its periphery, as their use often results in the jarring or jolting of vehicles; but it is formed with a cylindrical periphery, which will present but a small portion of its surface to the ground, and thus frequently pass between loose stones and the like by pushing them aside. The spokes 3 are also hollow or tubular in construction and made of any suitable kind of metal in the two parts or sections 5 and 6, which have different lengths and diameters, the inner sections 5 having greater lengths and diameters than the outer sections 6, so that the latter may be slid or telescoped into the former. The inner ends or portions of these inner sections 5 of the spokes are exteriorly screw-threaded and fitted into the correspondingly-formed openings 7 in the metallic hub 4, and the outer ends of the outer sections 6 are provided with the solid plugs 8, which are welded or otherwise rigidly secured therein and formed with the forked or concaved shoulders 9, which fit snugly against the inner surface of the hollow or tubular rim 2 and firmly support the same by their pins or tenons 10, fitting into the openings 11, formed in the inner surface thereof; also, these shoulders prevent the spokes from turning axially while being tightened or lengthened. The outer and smaller sections 6 of the hollow or tubular spokes 3 are exteriorly screw-threaded, as at 6', along their inner portions, are projected or telescoped for suitable distances into the inner and larger sections 5 of said spokes, and are provided with the long and interiorly-screw-threaded nuts 12, which for the purpose of turning them may be exteriorly shaped, as desired; but they are preferably made in polygonal form; also, they are hollowed or concaved at their inner ends 13 for forming snug or tight-fitting seats for turning upon or against the rounded or convexed outer ends 14 of the inner and larger sections of said spokes. As these long nuts are supported upon or rest against the outer ends of the larger sections of the spokes, they will when turned withdraw or force the smaller screw-threaded sections out of said larger sections for suitable distances, and thereby lengthen the spokes, tighten the rim, make the whole wheel firm, and prevent all rattling; also, owing to the extended surface that is in contact between said smaller screw-threaded sections of the spokes and these long nuts, the latter will ordinarily remain in the positions to which they have been turned or adjusted; but it is preferable to hold them firmly or fixed in whatever positions they may be placed, so as to prevent any inward movement of the smaller spoke-sections, and therefore the jam or lock nuts 15 are provided for this purpose, which are placed or abutted against the outer ends of said long nuts; also, this same result can be produced by passing set-screws through the larger sections of the spokes and forcing their ends against the smaller sections. These jam or lock nuts 15 can also be made sufficiently long to only require interior screw-threading along their outer portions for holding them in place and so as to leave the interiors of their inner portions smooth for forming shields or sleeves, which will fit over or around the inner portions of the shorter and smaller sections 6 of the spokes, and thereby conceal and protect any of the screw-threading thereon which may be exposed after the adjustment of the spokes and the consequent tightening of the rim of the wheel have been effected.

In Fig. 2 of the drawings is illustrated the metallic hub 4, which is especially adapted for employment in this class of vehicle-wheels, and which is formed with the interiorly-screw-threaded bore or opening 16, within the opposite ends of which are fitted the two parts or sections of the vertically-divided and externally-screw-threaded journal-box 17, which is provided at the outer end of its two parts or sections with the annular flanges 18, to which power may be applied for the removal of said journal-box for repair or the like, and also for the exchange or substitution of boxes having differently-sized openings for fitting axle-journals of varying sizes, whereby the same wheels may be applied to different vehicles. A space of suitable size is left between the inner ends of the two parts or sections of this journal-box, which forms an oil-chamber 19, which is supplied through one or more small ducts or channels 20, which are held normally closed by the screw stoppers or plugs 21, which prevent the oil from escaping and dust or other foreign matter from entering. By the use of these devices the lubrication of the journal-axles is effected much easier and quicker than usual, as the wheels do not have to be removed, and also other objections are avoided.

In addition to what is obvious and already explained in relation to the advantages incident to my improved vehicle-wheel it may be further stated that, the rim and spokes being wholly made of metallic pipes or tubes, this wheel is exceedingly strong and very light in proportion to its strength, and also possesses a sufficient amount of spring or elasticity; that having no fellies or sections nor tire for its rim it can be manufactured without great expense comparatively, and also be ornamented as desired; that by increasing the size of the pipes or tubes and the number of the spokes it can be used on vehicles for transporting very heavy loads, and therefore is applicable to road-vehicles generally; that if its continuous and tubular rim or its two-part telescoped and adjustable spokes should become worn out or broken they can be more easily and cheaply repaired or replaced than the corresponding parts in other wheels, such as have rims with tires and a number of fellies or sections and differently-constructed spokes, and that this last-mentioned advantage or result can be effected without skilled assistance or by the owner of the vehicle in person, as the parts of the wheel are so simple in construction and arrangement that they can be easily removed and replaced by unskilled persons, it being only necessary to purchase such new parts, as may be desired.

Having thus fully described the construction and arrangements or combinations of the several parts and features of my invention, its operation and advantages, what I claim as new is—

1. A vehicle-wheel provided with two-part spokes which are made of tubular metal and telescoped intermediate of their ends and with a continuous or endless metallic rim having no tire, substantially as described.

2. A vehicle-wheel provided with two-part spokes which are made of tubular metal and telescoped intermediate of their ends, with means for adjusting the length of said spokes, and with a continuous or endless and cylindrical metallic rim having no tire.

3. A vehicle-wheel constructed entirely of metal and provided with a rim which is wholly composed of a continuous pipe or tube, with two-part tubular spokes which are telescoped intermediate of their ends, and with means for adjusting the length of said spokes, substantially as described.

4. A vehicle-wheel constructed entirely of metal and provided with a rim which is wholly composed of a continuous pipe or tube, with two-part tubular spokes which are telescoped intermediate of their ends, and with means for adjusting the length of said spokes, said means including the exteriorly-screw-threaded portions of the outer parts of said spokes and the long interiorly-screw-threaded nuts mounted thereon, substantially as described.

5. A vehicle-wheel constructed entirely of metal and provided with a rim which is wholly composed of a continuous pipe or tube, with two-part tubular spokes which are telescoped intermediate of their ends, and with means for adjusting the length of said spokes and holding them as adjusted, said means consisting of the exteriorly-screw-threaded portions of the outer parts of said spokes and the long interiorly-screw-threaded nuts and jam or lock nuts mounted thereon, substantially as described.

6. A vehicle-wheel constructed entirely of metal and provided with a rim which is wholly composed of a continuous pipe or tube having openings in its inner surface, with a hub having screw-threaded spoke-openings, with two-part tubular and telescoped spokes having screw-threaded inner ends and forked or concaved shoulders with tenons at their outer ends, and with means for adjusting the length of said spokes, substantially as described.

7. A vehicle-wheel constructed entirely of metal and provided with a rim which is wholly composed of a continuous pipe or tube having openings in its inner surface, with a hub having screw-threaded spoke-openings, with two-part tubular and telescoped spokes having screw-threaded inner ends and forked or concaved shoulders with tenons at their outer ends, and with means for adjusting the length of said spokes, said means including the exteriorly-screw-threaded portions of the outer parts of said spokes and the long interiorly-screw-threaded nuts mounted thereon, substantially as described.

8. A vehicle-wheel constructed entirely of metal and provided with a rim which is wholly composed of a continuous pipe or tube having openings in its inner surface, with a hub having screw-threaded spoke-openings, with two-part tubular and telescoped spokes having screw-threaded inner ends and forked or concaved shoulders with tenons at their outer ends, and with means for adjusting the length of said spokes and holding them as adjusted, said means consisting of the exteriorly-screw-threaded portions of the outer parts of said spokes and the long interiorly-screw-threaded nuts and jam or lock nuts mounted thereon, substantially as described.

9. A vehicle-wheel constructed entirely of metal and provided with a rim which is wholly composed of a continuous pipe or tube, with two-part and tubular spokes, and with a hub having an interiorly-screw-threaded bore or opening and a two-part vertically-divided exteriorly-screw-threaded and removable journal-box, substantially as described.

10. A vehicle-wheel constructed entirely of metal and provided with a rim which is wholly composed of a continuous pipe or tube, with two-part tubular and adjustable spokes, and with a hub having a two-part and vertically-divided journal-box in its bore, a space or oil chamber between said parts, one or more feed-ducts leading thereto, and one or more screw-plugs for normally closing said ducts, substantially as described.

In testimony whereof I affix my signature in presence of two witnesses.

WILLIAM W. TAYLOR.

Witnesses:
DILLARD BERRYMAN,
JAMES DUDLEY.